United States Patent [19]
Scherl

[11] 3,751,628
[45] Aug. 7, 1973

[54] METHOD FOR ARC WELDING WITH OVERLAPPED BAND ELECTRODES

[75] Inventor: Peter Scherl, Kapfenberg, Austria

[73] Assignee: Gebr. Bohler & Co. AG, Kapfenberg, Austria

[22] Filed: Dec. 22, 1970

[21] Appl. No.: 100,749

[30] Foreign Application Priority Data
Dec. 24, 1969 Austria.................................. 12047

[52] U.S. Cl. .................................. 219/137, 219/73
[51] Int. Cl. .............................................. B23k 9/00
[58] Field of Search.................... 219/137, 136, 130, 219/76, 74, 73

[56] References Cited
UNITED STATES PATENTS
3,271,554  9/1966  Johnson ............................... 219/76
2,151,914  3/1939  Hopkins............................... 219/130
2,091,871  8/1937  Meier.................................... 219/76
3,358,115  12/1967  Arnoldy............................... 219/76
2,083,309  6/1937  Applegate............................. 219/76

FOREIGN PATENTS OR APPLICATIONS
990,208  4/1965  Great Britain...................... 219/137

Primary Examiner—J. V. Truhe
Assistant Examiner—George A. Montanye
Attorney—Arthur O. Klein

[57] ABSTRACT

An improved arc-welding process and apparatus for producing welded seams by means of band or flat strip electrodes. The apparatus of the invention uses at least two band or flat strip electrodes which overlap at least partially. The aforementioned flat strip electrodes are then welded by means of arc-welding in a common welding bath.

12 Claims, 15 Drawing Figures

Patented Aug. 7, 1973

Inventor:
Peter SCHERL
by: Arthur O. Klein
Attorney

Patented Aug. 7, 1973    3,751,628
2 Sheets-Sheet 2
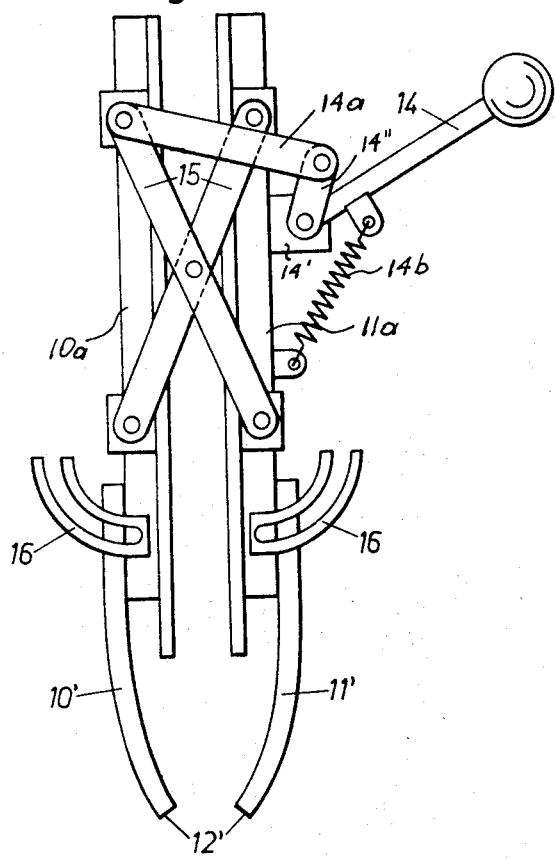
Fig. 4
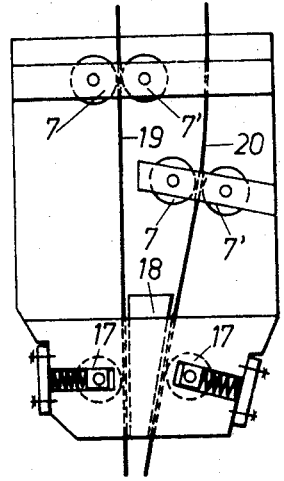
Fig. 5
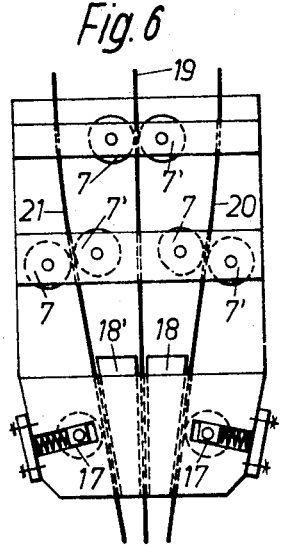
Fig. 6
FIG. 7a
FIG. 7b
FIG. 7c
FIG. 9a
FIG. 9b
FIG. 9c
FIG. 8a
FIG. 8b
FIG. 8c
Inventor:
Peter SCHERL
by: Arthur O. Klein
Attorney

METHOD FOR ARC WELDING WITH OVERLAPPED BAND ELECTRODES

BACKGROUND OF THE INVENTION

The apparatus of this invention produces a built-up weld or joint weld seam by using blank band electrodes and a welding head in an arc-welding process.

Automatic arc-welding processes are more and more frequently used in industry because of the considerable savings that can be obtained with such a process as compared to the old-fashioned, non-automatic arc-welding processes. One of these known prior art processes consists of applying a band electrode via a welding head which continuously feeds the band electrode while it is being welded in an arc-welding process wherein the arc is covered by a welding powder.

It is already known in the art, in order to increase the melting of the band electrode and in order to decrease the penetration, to apply a layer of metal particles of predetermined thickness onto the base layer and to melt this layer of metal particles by means of the arc produced in the arc-welding process. The use of the band electrode in such an arc-welding process thus modifies this process as follows: There is placed adjacent to the lateral edge of a weld seam on a base layer an additional metallic layer in the form of a band and a welding crater is formed by melting the aforementioned additional metallic layer, the band electrode, the edge of the previously produced welding seam, as well as the surface layer of the base metal. Although this prior art process does have certain significant advantages, it is, in practice, restricted to use with flat base materials and can only be effective if the various parameters controlling this process are precisely maintained. Thus the thickness of the layer of the metal particles must be precisely maintained, this layer being covered with welding powder. On the other hand, the edge of the first-produced welding seam frequently has an irregular configuration making it quite difficult to apply the band electrode thereon and the width of the welded material forming the welding seam is thus limited to the width of the band electrode used in the process.

Thus, the welding seams produced as described hereinabove frequently have a caterpillar-like appearance. In order to improve on this appearance, it has been proposed to use in lieu of one wide band electrode two narrower band electrodes, which are simultaneously molten down and are spaced with respect to each other thus producing a welding seam of reduced width.

SUMMARY OF THE INVENTION

The band electrode welding process of the present invention has some significant advantages when compared with similar processes forming part of the prior art. Thus, the ignition and maintenance of the arc is facilitated. The process can be carried out with reduced penetration and increased melting output as well as increased welding velocity. Furthermore, in the process of the present invention there is produced a welding bath of substantially increased width. Lastly, the possibility exists that, with the processs of the invention, there can be carried out in a relatively simple manner, a welding seam having welding material compositions which have not been possible to attain heretofore.

The arc-welding process of the instant invention serves to produce built-up and joint welds by using blank band electrodes and a welding head. At least two band electrodes are fed by means of the welding head onto a base material. The two band electrodes overlap each other, at least partially, and are electrically connected to an electric power source so as to permit the passage of electric current therethrough. The arc formed in the welding process produces a common welding bath in which the band electrodes are molten.

The term "band electrode" signifies any type of electrode configuration wherein the width of the electrode is substantially larger than its thickness. The relation between the width and thickness of the electrode bands ranges from 360::1 to 8::1. The most frequently-used dimensions for the band electrode are about 60 × 0.5 mm, respectively, a relationship of 120::1 of width to thickness. "Electrically-connected" signifies that the band electrodes are in electric contact with one pole of an electric power source used for the welding process. It is, however, also possible and is within the scope of the instant invention that the power input to the electrodes is carried out from a plurality of sources of electric power.

In accordance with a further advantageous feature of the process of this invention it is possible to use in the welding process band electrodes of different sizes, respectively, different widths and also of different compositions. It has been surprisingly found that the band electrodes can be welded even when they are offset with respect to each other as they are fed to the welding site. A particularly advantageous feature of the process of the invention resides in the possibility to produce a welding seam by means of two or three offset band electrodes having the same standard dimensions thereby having the possibility to produce a weld seam of pre-selected width ranging from 1 to practically 3 times the width of the band electrode. Heretofore, it was necessary, in order to attain such a range of width of a welding seam to utilize a row of welding bands of different widths. Also heretofore, the band electrode would gradually be turned in the welding direction in order to obtain a welding seam of reduced width. These types of welding seams have the drawback that their edges did not flow well outwardly. Furthermore, the initial and end pieces of the weld wound up oblique. A further, very significant advantage of the process of the invention resides in that band electrodes, which, due to their difficult workability, could only have been produced with relatively reduced width, can now, with the aid of the process of this invention, be welded so as to produce a welding seam of increased width.

A further significant advantage of the process of this invention resides therein that the band electrodes are welded onto the base material in an expanded or spread position, that is in such a manner that a slit is formed between the broad sides of themselves which, in general, amounts to 2 to 10 mm, but in certain cases even up to 25 mm.

BRIEF DESCRIPTION OF THE DRAWING

The present invention is illustrated by way of example in the accompanying drawings which form part of this application, and in which:

FIG. 4 is an elevational front view of a portion of a modified welding head;

FIGS. 5 and 6 are schematic elevational views of two other modified welding heads;

FIGS. 7 to 9 are schematic cross-sectional views of band electrodes in various positions which they may assume as they are being fed through the welding heads of the apparatus of the present invention.

DESCRIPTION OF PREFERRED EMBODIMENTS

Figure 1:
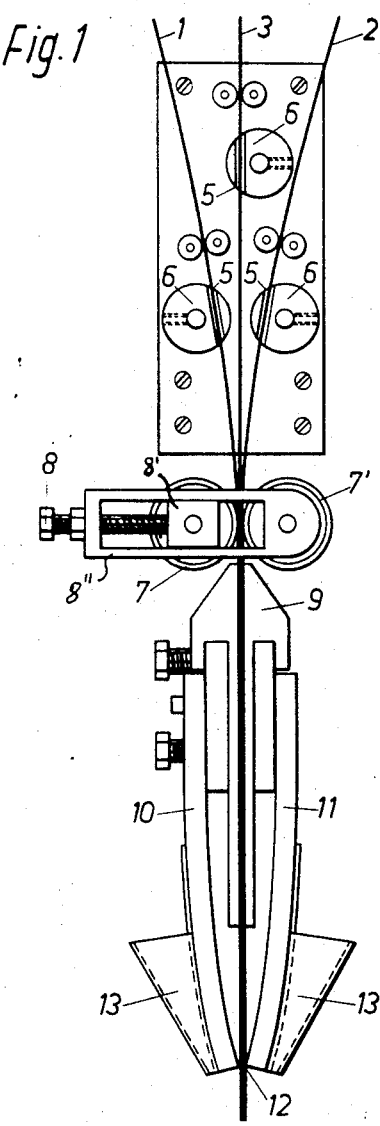
FIG. 1 is a front elevational view of a welding head used in the process of the invention.
Figure 2:
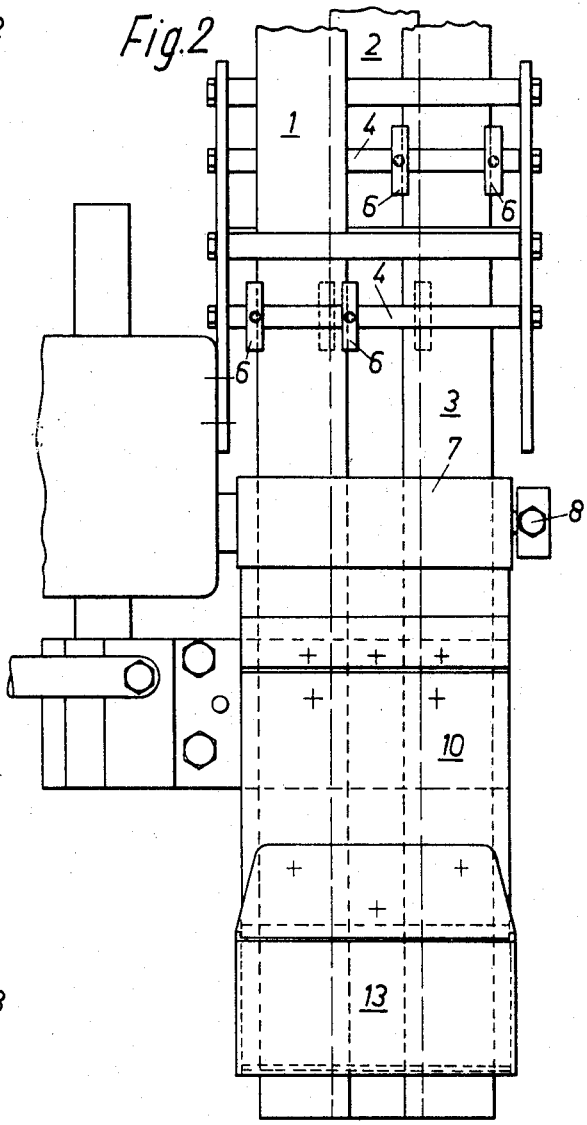
FIG. 2 is a side elevational view of the welding head illustrated in FIG. 1.
Figure 3:
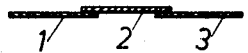
FIG. 3 is a schematic cross-sectional view of three band electrodes shown in a preselected relationship as they are being fed to a welding site by the welding head illustrated in FIGS. 1 and 2.

The welding head illustrated in FIGS. 1 and 2 has three band electrodes 1, 2, 3, which are fed through the welding head from three different band electrode spools (not illustrated) so as to be positioned at the top of the welding head as is illustrated in FIG. 1. The welding head is provided with three feed discs 6 pivotally mounted on shafts 4 in the welding head. Each one of the feed discs 6 is provided with a feed channel 5 through which the respective band electrodes are fed. The feed discs 6 can be easily exchanged by being removed from their respective shafts 4. The three band electrodes 1, 2, 3 are then fed between a pair of feed rollers 7, 7'. The distance between the pair of feed rollers can be adjusted by means of a threaded bolt 8 which abuts against a block 8' on which the feed roller 7 is rotatably mounted. The block 8' is slidably mounted in a member 8'' which also rotatably supports the roller 7'. By turning the bolt 8, the distance between the rollers 7 and 7' can be adjusted. The three band electrodes 1, 2, 3 are then fed through an insulating body 9 on which there are mounted two contact plates 10, 11 preferably made of copper. These contact plates are connected to a pole of a non-illustrated source of electrical power. The contact plates 10, 11 are adjustably mounted and have lower edges 12 defining a an adjustable narrow passage through which the three band electrodes 1, 2, 3 are guided. As the band electrodes 1, 2, 3 are guided through the slit formed by the contact plates 10, 11, an electrical contact is made with the outer electrodes 1, 2, thereby also conducting electricity through the middle electrode 3. The contact plates 10, 11 are provided at their exterior lower ends with funnels 13 through which the welding powder is fed during the welding process. As can be clearly seen from FIG. 3, the electrodes 1, 2, 3 are fed through the welding head illustrated in FIGS. 1 and 2 in an expanded position relative to each other thereby producing a welding seam of considerable width.

FIG. 4 illustrates the special construction of a pair of contact plates which can be used in a welding head in accordance with this invention. In the construction of FIG. 4, the distance between the contact plates 10', 11', that is, their lower edges 12', can be adjusted in a particularly simple and reliable manner by means of a lever 14 which is pivotally mounted on a support member 14'. The lever 14 is also rigidly connected to a second lever 14'' which is pivotally connected via a member 14a to a scissor-like pair of members which are pivotally connected to opposite support members 10a, 11a. The lever 14 is also biased downwardly by a spring 14b connected, on the one hand, to the lever 14 and, on the other hand, to the support member 11a. Thereby the lever 14 is urged downwardly and urges the two support members 10a, 11a toward each other. If the bundle of band electrodes are to be welded onto a base layer in an expanded condition, then this can be carried out by means of the construction illustrated in FIG.4 in a simple manner. The contact plates 10', 11' are provided with arcuate support members 16 adapted to adjustably support a pair of funnels (not illustrated) for dispensing a welding powder during the welding process. The support members 16 may also, in the event the welding operation is to be carried out with a gas cover in lieu of a welding powder, be provided with welding gas feed means (not illustrated).

FIGS. 5 and 6 illustrate schematically two modified versions of a welding head to be used in the process of the present invention. The modified welding head of FIG.5 includes two pairs of feed rollers 7, 7'. The band electrodes 19, 20 are fed past a contact member 18 against which they are biased by means of a pair of spring-biased rollers 17.

In the embodiment of FIG.6 there are shown three band electrodes 19, 20, 21 which are fed through the welding head by means of three pairs of feed rollers 7, 7'. The central band electrode 19 is fed between a pair of contact members 18, 18' whereas the band electrodes 20, 21 are fed respectively along the exterior sides of the contact members 18, 18'. A pair of spring-biased rollers 17 bias the contact members 18, 18' together as well as respectively bias the band electrodes 20, 21 against the contact members 18, 18'. The contact members 18, 18' are preferably slidably mounted, so that it is possible in a simple manner to vary the spreading of the band electrodes, that is, to vary the configuration of the electrode bundle during the welding process.

It should be noted that it has surprisingly found that it is not necessary to have the band electrodes completely overlap each other but that a partial overlap of the band electrodes in the melting zone thus surprisingly produce a high melting output. This is due to the fact that the arc, respectively arcs, formed during the welding process wander along the leading edge of the band electrode as it is molten down. The "spreading" of the electrode bundle in the welding process of the invention intensifies this effect thereby producing a plurality of arcs.

The invention is further described and explained in conjunction with a plurality of examples. In the following examples the band electrodes were always fed with D.C. current from a positive pole of an electric source. It should be noted, however, that the opposite polarity would also work as well as the use of an A.C. source of electrical power for obtaining a good welding result.

EXAMPLE 1

This example relates to built-up welds on an unalloyed constructional steel having a composition of 0.08% C, 0.26% Si, 0.45% Mn. The welding process was carried out with a welding powder, referred herein as a UP-process, wherein an about 20% mixture of an overalloyed austenitic welding band was to be applied. The results (a) attained according to the welding process of the invention were compared with a weld seam produced with one band electrode having an identical cross-sectional area (b), as well as with a welding seam produced by a single band electrode of identical dimensions (c). The welding powder used in the processes was an agglomerated powder having the following composition: 29.5% $SiO_2$ by weight, 27.1% CaO by weight, 23.8% $CaF_2$ by weight, 7.3% $ZrO_2$ by weight, 3.5% $Al_2O_3$ by weight, 2.6% $Na_2O$ by weight, 2.2% Mn by weight, and 3.1% Cr by weight. The aforedescribed welding powder is hereinafter referred to as welding powder I. The composition of the band electrodes in all of the aforedescribed welding processes was the same, that is: 0.017% C by weight, 0.47% Si by weight, 1.67% Mn by weight, 24.2% Cr by weight, 12.82% Ni by weight, 0.60% Nb by weight, P and S being under 0.020% by weight, the remainder Fe.

a. A welding process carried out with two band electrodes being fed to a welding head whereby the two band electrodes are uniformly superimposed on each other and are fed in this condition to the welding head. The band electrodes having the dimensions of 60 × 0.5 mm. The following results were obtained:

| Welding Current | Welding Velocity | Mixture |
| --- | --- | --- |
| 790 A 30 V | 14 cm/min | 7% |
| 790 A 30 V | 14 cm/min | 9% |
| 990 A 30 V | 15 cm/min | 10% |
| 990 A 30 V | 17 cm/min | 19% |
| 1200 A 30 V | 18 cm/min | 22% |
| 1200 A 30 V | 21 cm/min | 28% | b. A welding process with a single band electrode having the dimensions 60 × 1 mm. The following results were obtained:

| Welding Current | Maximum Welding Velocity | Mixture |
| --- | --- | --- |
| 790 A 30 V | 12 cm/min | 9.5% |
| 990 A 30 V | 15 cm/min | 23 % |
| 1200 A 30 V | 18 cm/min | 35.5% | c. Welding process with a single welding band having the dimensions 60 × 0.5 mm. The following results were obtained:

| Maximum Possible Welding Current | Maximum Welding Velocity | Mixture |
| --- | --- | --- |
| 730 A 30 V | 13 cm/min | 17% |

From the foregoing results it can be noted that the penetration, respectively, the mixing of the two separate electrode bands having a total cross-sectional area equal to that of a single electrode band is, at the same and even at 15% higher welding velocities, substantially lower than the mixing with one electrode band of equivalent cross-sectional area. Thus the over-alloying of the band can be considerably reduced in order to obtain the desired weld material composition. On the other hand, when one wishes to obtain the same mixture, i.e., penetration, the welding velocity can be considerably increased with the process of this invention, while always having the security that the welding process will be quite satisfactory and that a flat, uniformly formed welding material will form the welding seam having a height of 6.5 to 7 mm. The welding output in the first case a) was, on the average, 23.5 kg/h, whereas in the case b) it was, on the average, 19.5 kg/h and in the third case c) it was 14.1 kg/h.

EXAMPLE 2

Built-up welds were produced on an unalloyed constructional steel with 2, 3, and 4 uniformly overlapping welded electrode bands having a cross-section of 60 × 0.5 mm according to the UP-process with a welding powder I. The electrode bands had the following composition: 0.020% C by weight, 0.45% Si by weight, 1.82% Mn by weight, 21.72% Cr by weight, 11.13% Ni by weight, P and S under 0.020% by weight, the remainder Fe.

The results obtained are listed in the following table:

| Number of Band Electrodes | Welding Current | Welding Velocity | Mixture | Welding Output |
| --- | --- | --- | --- | --- |
| 2 | 990 A 30V | 13 cm/min | 4.1% | 22.9 kg/h |
| 3 | 1250 A 30V | 13 cm/min | 4.0% | 27.5 kg/h |
| 4 | 1500 A 30V | 13 cm/min | 3.8% | 31.5 kg/h |

The penetration into the base material was very uniform; the height of the welding bead amounted to 6.5mm (2 electrode bands), 8.5 mm (3 electrode bands), respectively, 10.6 mm (4 electrode bands).

EXAMPLE 3

This example, as well as the following examples 4 to 7 illustrate that the process according to the present invention provides the possibility to substantially broaden the width of the weld bath when compared to the electrode band width. This feature of the process is quite advantageous because the reduced danger of slag inclusions at the edges of the weld bath constitutes an important advantage of the process, in particular since it is well-known that in this region there often occurs a marked increase of slag inclusions.

In this example, a built-up weld was produced that corresponded insofar as the base material, electrode composition, dimensions of the band electrode, and the weld powder used, to what has been set forth in Example 1, (a) first paragraph thereof. Two electrode bands were welded under identical welding conditions, that is, 990 A, 30 V, 15 cm/min. The two electrode bands were welded in a pronounced offset relationship with respect to each other as compared to example 1(a). In all cases there resulted a very satisfactory built-up weld with very uniform penetration and a maximum of 10% mixture by the base layer. The dimensions of the overlap of the band electrodes and the thus-resulting weld bead width and the height of the built-up weld were as follows:

| Overlap | Weld Bead Width | Weld Bead Height |
| --- | --- | --- |
| (60 mm=) 100% | 62 mm | 6.9 mm |
| (30 mm=) 50% | 91 mm | 5.8 mm |
| (10 mm=) 16.5% | 110 mm | 4.6 mm |

It is emphasized that the appearance of the weld beads was, at all times, surprisingly completely even and smooth; even in the region of the overlap there was no significant bulging.

EXAMPLE 4

In this case the built-up welding was carried out with three electrode bands having dimensions of 60 × 0.5 mm and having a composition as set forth in Example 1. The welding operation was carried out with a current of 1,250 A, (1,300 A, respectively, 1,350 A), 30 V and 13 cm/min. The agglomerated welding powder used in the welding operation had the following composition: 21.4% $SiO_2$ by weight, 26.2% CaO by weight, 3.1% $CaF_2$ by weight, 14.8% MgO by weight, 7.2% MnO by weight, 21.0% $Al_2O_3$ by weight, 0.8% $Fe_2O_3$ by weight, 5.3% Cr by weight.

It was found that the built-up weld was, even when electrodes are used in an offset relationship as illustrated schematically in FIG.7, even, uniform and smooth. The following relationships were found:

weld                    weld

| | Bead Width | Bead Height |
|---|---|---|
| a. 100% overlap of the three electrode bands | 63 mm | 8.4 mm |
| b. two bands with a distance of 5 mm therebetween welded one next to the other; one band having on each of the outer bands a 27 mm overlap and being welded in the middle region | 125 mm | 6.2 mm |
| c. As in (b), but with a 30 mm distance of the two outer bands from each other | 148 mm | 4.7 mm |

EXAMPLE 5

This example concerns a combination of four, respectively five band electrodes having the dimensions 30 × 0.5 mm. These electrodes, on the one hand, have a 100% overlap (see FIG.8a) and, on the other hand, are positioned in the welding head in such a way that the two inner electrode bands are closely positioned adjacent to each other and the two outer electrode bands are arranged in a symmetrical manner so that they provide an upper and lower overlap, each amounting to 50% and are welded onto the base material in this arrangement (see FIG. 8b). The band electrodes have the following composition: 0.018% C by weight, 0.43% Si by weight, 1.71% Mn by weight, 20.44% Cr by weight, 13.90% Ni by weight, 2.62% Mo by weight, P under 0.020% by weight, S under 0.010% by weight, the remainder Fe. The welding powder was the same as set forth in the preceding example (hereinafter referred to as welding powder II). The welding conditions were with a 100% overlap, 800 A, 28V and 14 cm/min, whereby a bead height of 10.5 mm was obtained. The other band electrode arrangement (FIG.8b) was welded with 900 A, 28 V, and 16 cm/min, whereby the weld bead height amounted to 7.2 mm. In both cases the built-up weld had a smooth and even appearance.

In a further experiment carried out, the band electrode arrangement was, as illustrated in FIG.8c, wherein five electrode bands of the type described herein are applied to the base layer so as to form two welded layers thereon. The distance between the band electrodes in the symmetrical arrangement illustrated in FIG.8c is 5 mm. The welding conditions were as follows: 1,100 A, 30 V, and 11 cm/min, whereby a weld bead width of 101 mm and a weld bead height of 5.0 mm was obtained.

The following Examples 6 and 7 illustrate the use, respectively combination of electrode bands of different widths and different thicknesses in various combinations.

EXAMPLE 6

Two band electrodes, having the composition as set forth in Example 2, and having the dimensions 60 × 0.5 mm and 90 × 0.5 mm have been welded in various arrangements onto a base layer, these arrangements being illustrated in FIGS.9a to 9c. The arrangements are as follows:

a. The narrower band is in the middle;
b. The narrower band and the wider band are aligned with respect to one of their longitudinal edges;
c. The narrower band overlaps only a third of the width of the broader band.

The band electrodes were welded onto a base material consisting of an unalloyed constructional steel by using a welding powder II and using the welding conditions in the examples a) and b) of 1,100 A, 28 V, and 12 cm/min, respectively with example c) of 1,150 A, 30 V, and 10 cm/min.

In all of the aforedescribed three band electrode arrangements there were obtained smooth, even weld beads the width of which in the case c) amounted to 90 to about 118 mm, whereas the height of the weld bead was reduced from 6 to 5.3 mm.

EXAMPLE 7

Built-up welds were produced with band electrodes of different sizes and having the compositions set forth in Example 2. A welding powder I was used with a pair of electrode bands having a 100% overlap and the same width, and also with electrode bands of different widths. Excellent results were obtained such as, for example, weld beads having a smooth, even surface.

The following welding operations were carried out:

| | |
|---|---|
| a. one band 60 × 2 mm<br>one band 60 × 0.5 mm<br>(100% overlap) | Welding Data:<br>1500 A, 30 V, 13 cm/min<br>Weld Bead Width:<br>64 mm<br>Weld Bead Height:<br>11.6 mm |
| b. two bands 60 × 0.5 mm arranged as outer electrode bands,<br>three bands 20 × 1 mm arranged therebetween (100 % overlap) | Welding Data:<br>1400 A, 30 V, 13 cm/min<br>Weld Bead Width:<br>63 mm<br>Weld Bead Height:<br>10.9 mm |
| c. one band 60 × 0.5 mm<br>two bands 15 × 2 mm (in the middle) | Welding Data:<br>1050 A, 30 V, 13 cm/min<br>Weld Bead Width:<br>61 mm<br>Weld Bead Height:<br>6.2 mm |
| d. one band 60 × 0.5 mm<br>two bands 15 × 2 mm (mounted on the edges of the wider band) | Welding Data:<br>1150 A, 30 V, 15 cm/min<br>Weld Bead Width:<br>62 mm<br>Weld Bead Height:<br>6.7 mm |

EXAMPLE 8

This example, as well as the following examples 9 to 15 illustrate the use of band electrodes of different compositions. The arrangements of these examples are particularly advantageous as they can be used as weld surfaces that are corrosion resistant.

As is well-known in the art, the application of a welded layer on a base material, said welded layer having an increased hardness and the electrode and used having an increased C content can only be carried out to a certain extent. Thus, for example, a tool steel band of the composition 1.26% C by weight, 0.24% Si by weight, 0.31% Mn by weight, 0.72% Cr by weight, 1.88% W by weight, 0.14% V by weight, is practically not weldable even when the most suitable welding powders for this type of an electrode band are used. Thus an electrode band of the aforedescribed composition will result in a weld bead having a very uneven and rough surface and also slag remainders will appear which cannot be removed.

If this type of a band is, however, welded in accordance with the apparatus of this invention in combination, for example, with a 17 to 18% Cr by weight- steel band, there result flaw-free and very smooth weld beads having a very high hardness and increased corrosion resistance. Both of the electrode bands had the dimensions 60 × 0.5 mm; the Cr-steel band had the composition 0.07% C by weight, 0.4% Si by weight, 0.4% Mn by weight,18% Cr by weight, the remainder Fe. The two welded electrodes were welded onto a base layer in a uniformly overlapping relationship with the welding powder containing Mn having the following composition: 39.3% $SiO_2$ by weight, 10.2% CaO by weight, 6.2% $CaF_2$ by weight, 2.1% $Al_2O_3$ by weight, 39.6% MnO by weight, 2.4% FeO by weight hereinafter referred to as welding powder III. The following welding conditions were used: 900 A, 30 V, welding velocity of 13 cm/min; with the aforedescribed materials and process a very smooth, uniform and completely flawfree built-up weld was obtained and applied onto a soft, unalloyed base layer and this weld had hardness values in only one position of 58 to 60 HRc. The weld bead height amounted to 5.5 mm and the weld bead width amounted to 65 mm.

Somewhat higher hardness values, namely 60 to 62 HRc were obtained in an analog manner with an electrode band of the same dimensions having the following composition: 0.20% C by weight, 0.85% Si by weight, 0.4% Mn by weight, 17.8% Cr by weight, 1.1% Mo by weight, the remainder Fe.

It should be noted that, contrary to all expectations, even a combination of two tool steel-electrode bands of the aforerecited composition, when otherwise the identical welding conditions are used, resulted in a weld bead having very fine flow lines and a hardness of HRc 54. These weld beads did not indicate any slag inclusions.

EXAMPLE 9

The aforedescribed experiment of Example 8 was repeated with an Mo-containing Cr-electrode steel band with the following difference, namely that, in lieu of the tool steel band having the dimensions 60 × 0.5 mm, an analog tool steel band having the dimensions 40 × 0.5 mm (arranged in the middle of the wider band) was used in the welding process. The welding conditions were as follows: 850 A, 30 V, and 13 cm/min; the hardness of the welded layer in one position amounted to 58 HRc.

EXAMPLE 10

This example illustrates that when very high degrees of hardness are required in a layer of welded material, a combination of a high-speed-steel band having an average to low C content can be combined with a band electrode having an Iron base to obatin the required hardness. Thus the necessity of using a highspeed-steel electrode band having a high carbon content is avoided. As is well-known, the use of such an electrode band in a welding process causes great difficulties and the C-content is burnt off to a great extent during the welding process. The iron base band electrode of the aforedescribed combination has,preferably, a 1 to 2 % carbon content. The high-speed-steel band has the following composition: 0.82% C by weight, 0.37% Si by weight, 0.32% Mn by weight, 4.22% Cr by weight, 4.83% Mo by weight, 1.98% V by weight, 6.60% W by weight, the remainder Fe. The dimensions of the high-speed-steel electrode band were 60 × 0.5 mm. The aforedescribed electrode band was welded together with an electrode band made out of tool steel as set forth in Example 8, and having a 1.26% carbon content. The two electrode bands were welded onto a base layer in uniform overlapping relationship. The welding operation was carried with a welding powder III and the following welding conditions: 900 A, 30 V, 15 cm/min. The weld beads obtained with the aforedescribed electrode bands were very smooth and uniform and had hardness values of 61 to 62 HRc. An analysis of the weld beads gave the following results: 0.91% C by weight, 0.66% Si by weight, 0.91% Mn by weight, 2.45% Cr by weight, 2.26% Mo by weight, 0.61% V by weight, 4.06% W by weight, the remainder Fe.

In order to obtain a good comparison it should be noted that the C-content of the high-speed-steel band when it is used without a combination as set forth hereinabove, drops to about 0.40% C by weight.

EXAMPLE 11

In order to produce a hard welded layer of a base of "Stellite," respectively "Celsite" having the known Co-base alloy compositions, the following combination of band electrodes having dimensions of 60 × 0.5 mm were utilized:

a. An electrode band of an easily workable Co-base alloy having the composition 0.18% C by weight, 0.80% Si by weight, 1.28% Mn by weight, 25.96% Cr by weight, 10.0% Ni by weight, 5.05% W by weight, 0.35% Fe by weight, the remainder Co;

b. A tool steel band as set forth in Example 8 having the composition of the Example 8;

c. A Co-band.

The following welding conditions were used: 1,250 A, 30 V, 13 cm/min. A particularly tough, hard welded layer was obtained in which the formed Cr-W- carbides are embedded in a tough Cobalt-base mass.

EXAMPLE 12

The welding industry is often faced with the task of applying an unalloyed base layer having about 0.20% C by weight with only one pass an 18/8 corresponding weld material layer having a thickness of 6 to 8 mm and having the maximum alloy contents of 0.04% C by weight, 18 – 21% Cr by weight, 9 – 11% Ni by weight, the remainder Fe. Such a welded layer can be produced in accordance with the process of this invention by combining one single over-alloyed band electrode with one or more normally alloyed band electrodes in accordance with the process of this invention.

The built-up weld is formed with band electrodes having 60 × 0.5 mm dimensions. One of the bands used has the composition of 0.019% C by weight, 24.05% Cr by weight, 12.70% Ni by weight, the remainder Fe. With this first electrode band there are used two additional electrode bands (possibly for also increasing the height of the formed layer) having the following compositions: 0.018% C by weight, 19.75% Cr by weight, 10.30% Ni by weight, the remainder Fe. The three bands are welded onto the base layer in uniformly overlapping relationship. A welding powder I and the following welding conditions were used: 990 A, 30 V, 13 cm/min. When one band was used, a mixing of 5.1% resulted and a weld bead height of 6.4 mm was obtained; the weld bead analysis resulted in the following: 0.029% C by weight, 20.80% Cr by weight, 10.93% Ni by weight. The combination of two normally alloyed electrode bands with the same welding powder and the following welding conditions: 1,250 A, 30 V, and 14 cm/min, resulted in a weld bead height of 8.3 mm, a mixing of 4.6%, and a welding bead analysis of 0.028% C by weight, 20.18% Cr, 10.55% Ni by weight, the remainder Fe.

In the following Examples 13 and 14 there are illustrated, in particular with respect to the welding output, important results when producing built-up welds with spread-out band electrodes.

EXAMPLE 13

With two uniformly covered and spaced from each other by 6 mm electrode bands having the composition: 0.022% C by weight, 0.40% Si by weight, 1.91% Mn by weight, 21.80% Cr by weight, 11.50% Ni by weight, P and S under 0.020% by weight, the remainder Fe, were welded onto a base layer as set forth in Example 1 with welding conditions of 990 A, 32 V, and a welding velocity of 18 cm/min and with a welding powder of the composition: 32.6% $SiO_2$, 28.3% MgO by weight, 19.2% $Al_2O_3$ by weight, $CaF_2$ 6.4% by weight, 4.1% CaO by weight, 5.9% Cr by weight, and 3.3% Fe by weight. Despite the very high welding velocity, there resulted a very satisfactory weld bead; the melting output reached 28.1 kg/h. The welding bead analysis was as follows: 0.036% C by weight, 0.63% Si by weight, 0.92% Mn by weight, 19.37% Cr by weight, 9.66% Ni by weight and the remainder Fe.

It should be emphasized here that if one would have used only one electrode band in the welding operation having identical dimensions, there could have only been obtained a flaw-free weld bead with a weld velocity of 12 cm/min and a welding output of 18.6 kg/hr. The mixing with the base layer was, in this case, equal to 32% which is exactly twice as high as with the welding of the two spread out band electrodes (16%) whereas the powder consumption per kg of band with the single band was approximately 50% higher.

EXAMPLE 14

There was carried out a welding operation with a welding powder as set forth in Example 13 and with the band electrodes in an uniformly covered and completely overlapping relationship. Therebetween it was formed a spacing or a slit of 1.6 mm width; thus the band electrodes were in an expanded or spread out position and not in contact with each other at the point of entering the welding zone. The composition of the band electrodes was the following: 0.049% C by weight, 0.37% Si by weight, 1.77% Mn by weight, 19.00% Cr by weight, 12.58% Ni by weight, the P and S content being under 0.020% by weight, the remainder being Fe. The band electrodes were used to produce an analog built-up weld. The following welding conditions were used: 990 A, 32 V, welding velocity of 12 cm/min. A very smoothly-formed welding bead having a very nice appearance was obtained. The penetration was about 11% and a welding output of 24.2 kg/hr was obtained. The welding material analysis was as follows: 0.054% C by weight, 0.62% Si by weight, 1.10% Mn by weight, 17.34% Cr by weight, 11.06% Ni by weight, the remainder Fe.

EXAMPLE 15

A filler band electrode having a width of 50 mm and a thickness of 2.5 mm was used in this example, the band forming the cover and having the following composition: 0.06% C by weight, 0.30% Mn by weight, traces of Si, less than 0.025% P by weight, respectively S, the remainder Fe, and having a filling of 77% Cr-powder, 2% Mn powder, 2% ferro silicon (45 %), 5.5% of Al-powder, and 11.5% of silver graphite were used in combination with a band electrode of 60 × 0.5 mm dimensions and consisting of: 25% Cr by weight, 4% Ni by weight, the remainder Fe. The combination of electrode bands was welded with the following welding conditions: 1,400 A, 30 V, and 15 cm/min. A very nicely-shaped welding bead was obtained having an even surface and a weld bead width of 62 mm and a weld bead height of 9.2 mm. This weld bead consisted of chromium-cast iron having 3.1% C by weight, 28% Cr by weight 1.4% Ni by weight.

The Examples 16 and 17 refer to combination welds and illustrate that the process of the present invention can also be advantageously used in this sense.

EXAMPLE 16

A fillet weld with two plates was produced with a difficult weldable steel of the following composition: 0.45% C by weight, 0.25% Si by weight, 0.62% Mn by weight, the remainder Fe (P being under 0.02% by weight and S being under 0.01% by weight).

The plates were of 10 mm thickness and were fixed by means of a support arrangement in a tub-type position and a connecting weld was produced with the welding powder I and three band electrodes being applied transversely to the welding direction and having equal overlapping relationship of the size 10 × 0.5 mm and of the composition: 0.11% C by weight, 0.46% Si by weight, 6.80% Mn by weight, 19.30% Cr by weight, 8.60% Ni by weight, (P and S being each under 0.02% by weight): the welding conditions were as follows: 550 A, 30 V, and 40 cm/min. A very flaw-free fillet weld of very nice appearance was obtained with a flaw-free root penetration.

A similarly favorable result was obtained with a further connecting weld which was carried out in an analog manner but in which the band electrode positions were applied to the base plates parallel to the welding direction.

EXAMPLE 17

In this example there were also produced fillet welds on a pair of plates of 10 mm thickness having a composition of 0.022% C by weight, 0.69% Si by weight, 1.02% Mn by weight, 17.54% Cr by weight, 2.26% Mo by weight, 11.55% Ni by weight, the remainder Fe with two electrode bands of 30 × 0.5 mm dimensions and having the composition of 0.018% C by weight, 0.42% Si by weight, 1.74% Mn by weight, 19.09% Cr by weight, 2.51% Mo by weight, 12.30% Ni by weight, the remainder Fe. The electrode bands were applied in a similar manner as in the preceding example. The position of the band electrodes was longitudinal with respect to the welding direction, the welding conditions being 650 A, 30 V, with a welding velocity of 55 cm/min. The resulting fillet weld bead was of a very nice appearance and had a flow-free root penetration.

Although the invention is illustrated and described with reference to a plurality of embodiments thereof, it is to be expressly understood that it is in no way limited to the disclosure of such a plurality of embodiments, but is capable of numerous modifications within the scope of the appended claims.

What is claimed is:

1. An arc-welding process for producing built-up and connecting welds in a welding direction with at least two bare band electrodes, comprising the steps of
   feeding said band electrodes through a welding head so that they exit therefrom in a uniformly and with respect to the welding direction at least partially overlapping relationship and make electrical contact with at least one source of electric power;

each of said electrodes having a width forming a major axis with the major axis being generally perpendicular to the weld direction;

passing an electric current through said electrodes from said source of electric power, producing an arc which melts the band electrodes while forming a common weld pool.

2. The process as set forth in claim 1, wherein said band electrodes have different dimensions.

3. The process as set forth in claim 1, including the step of expanding said band electrodes with respect to each other.

4. The process as set forth in claim 1, wherein said band electrodes have different compositions.

5. The process as set forth in claim 1, wherein at least one of said electrodes includes 0.5 to 4.3% carbon by weight.

6. The process as set forth in claim 5, wherein said one electrode contains 0.6 to 2.8% carbon by weight.

7. The process as set forth in claim 5, wherein another one of said electrodes contains 12 to 30% chromium by weight and up to 5% molybdenum by weight.

8. The process as set forth in claim 5, wherein another one of said electrodes consists of a chromium base alloy.

9. The process as set forth in claim 6, wherein said one electrode has an iron base and is welded with another electrode containing 12 to 30% chromium by weight and up to 5% molybdenum by weight.

10. The process as set forth in claim 9, wherein said other electrode contains cobalt.

11. The process as set forth in claim 1, wherein at least one of said band electrodes is a filler band electrode having a metallic cover and a charge of filler material, said material being selected from the group of alloying components, deoxidation materials and flux particles.

12. An arc fusion-melting process for producing built-up and connecting welds in a welding direction using plain band electrodes and a welding head, comprising the steps of feeding at least two band electrodes in an at least partially uniformly overlapping relationship relative to the welding direction through said welding head wherein they are current-conductively connected, each of said electrodes having a width forming a major axis with the major axis being generally perpendicular to the weld direction, passing an electric current through said band electrodes and melting the band electrodes by producing an arc to form a common welding bath.

* * * * *